United States Patent
Tosswill

(10) Patent No.: US 7,962,410 B2
(45) Date of Patent: Jun. 14, 2011

(54) CUSTOMIZABLE SOFTWARE AGENTS IN AN ELECTRONIC BILL PRESENTMENT AND PAYMENT SYSTEM

(75) Inventor: Andrew R. Tosswill, Florence, MA (US)

(73) Assignee: Pitney Bowes Inc., Stamford, CT (US)

( * ) Notice: Subject to any disclaimer, the term of this patent is extended or adjusted under 35 U.S.C. 154(b) by 2396 days.

(21) Appl. No.: 10/184,159

(22) Filed: Jun. 28, 2002

(65) Prior Publication Data

US 2004/0002919 A1 Jan. 1, 2004

(51) Int. Cl.
*G06Q 40/00* (2006.01)
(52) U.S. Cl. .............................. 705/40; 705/35; 705/39
(58) Field of Classification Search .................... 705/35, 705/39, 40
See application file for complete search history.

(56) References Cited

U.S. PATENT DOCUMENTS

| | | | |
|---|---|---|---|
| 5,383,113 A | 1/1995 | Kight et al. | 364/401 |
| 5,699,528 A | 12/1997 | Hogan | 395/240 |
| 5,761,650 A | 6/1998 | Munsil et al. | 705/34 |
| 5,832,460 A | 11/1998 | Bednar et al. | 705/27 |
| 5,845,267 A | 12/1998 | Ronen | 705/40 |
| 5,963,925 A | 10/1999 | Kolling et al. | 705/40 |
| 5,983,200 A * | 11/1999 | Slotznick | 705/26 |
| 6,078,907 A | 6/2000 | Lamm | 705/40 |
| 6,173,272 B1 | 1/2001 | Thomas et al. | |
| 6,175,855 B1 * | 1/2001 | Reich et al. | 709/202 |
| 6,282,552 B1 | 9/2001 | Thompson et al. | 705/41 |
| 6,289,322 B1 | 9/2001 | Kitchen et al. | 705/40 |
| 6,304,857 B1 | 10/2001 | Heindel et al. | 705/34 |
| 6,493,685 B1 * | 12/2002 | Ensel et al. | 705/40 |
| 6,765,997 B1 * | 7/2004 | Zirngibl et al. | 379/88.18 |
| 2002/0054170 A1 | 5/2002 | Clapp et al. | |
| 2003/0126206 A1 * | 7/2003 | Dezonno et al. | 709/204 |
| 2003/0182234 A1 | 9/2003 | Degroot | |
| 2004/0167853 A1 * | 8/2004 | Sharma | 705/40 |

FOREIGN PATENT DOCUMENTS

| | | |
|---|---|---|
| EP | 1077405 A | 2/2001 |
| EP | 1081617 A | 3/2001 |
| WO | WO0034859 | 6/2000 |
| WO | WO0067176 | 11/2000 |
| WO | WO0144932 | 6/2001 |
| WO | WO0146802 | 6/2001 |

(Continued)

OTHER PUBLICATIONS

Object-oriented Officevision Design, IBM Technical Document, n2 Jul. 1991, p. 112-114.*

(Continued)

*Primary Examiner* — Lalita M Hamilton
(74) *Attorney, Agent, or Firm* — Michael J. Cummings; Charles R. Malandra, Jr.; Steven J. Shapiro

(57) ABSTRACT

A customizable electronic bill payment and presentment system whereby the base logic for software agents need not be changed in order to provide customization to different billers. Rather, customization features are stored in data repositories, preferably in XML format. An administrator can select which agents to activate based upon a customized list of available agents. Then the customized parameters for activating and running the jobs with the agent is further loaded from customized repository files at the appropriate time. Accordingly, customization for a particular biller is achieved by changing data stored in a repository, rather than reprogramming core logic.

4 Claims, 9 Drawing Sheets

FOREIGN PATENT DOCUMENTS

WO            WO 01/77938 A2 * 10/2001
WO            WO0237393      5/2002

OTHER PUBLICATIONS

U.S. Appl. No. 60/175,753.*

Bhaven Shah: "Presenting XML to the Web" XML Journal, vol. 1, No. 1, Mar. 2000, pp. 18-23.

Lubell, J.: "Structured Markup on the Web" Markup Languages, MIT Press, Cambridge MA, vol. 1, No. 3, 1999, pp. 7-22.

Business Task Force of NACHA's Council for Electronic Billing and Payment: "An Overview of Electronic Billing Presentment and Payment Operating Models", Electronic Bill Payment/Presentment Business Pratcies, Apr. 1999, pp. 1-12.

"IBM", Web services architecture using MVC style, Naveen Balani, Mar. 5, 2002.

"IBM", Struts, an open-source MVC implementation, Malcolm Davis, Apr. 20, 2001.

"The Jakarta Project Struts", http://jakarta.apache.org.

My Yahoo! Screenshots Apr. 26, 2002, http://my.yahoo.com.

* cited by examiner

FIG. 3

```
HTTP Request
                                    ~200
/ebilling/appcontroller?url=company_profile/accounts/CompanyAccount&CompanyA
ccountKey=23

Action Descriptor XML:           ~300
 ~300
<controlAction path = "company_profile/account/CompanyAccount">
     ~<modelObject id="companyAccount" scope="page"
 302    class="docsense.bl.CompanyAccount"/>
             ~<setProperty name="AccountKey" type="long" array="false">
      303         <httpTag name="AccountKey" format=""/>
      304    </setProperty>
             ~<doAction name="Load"/>
         </modelObject>

<viewMap>
          ~<view frame="stdFrame" component="stdForm"
      305    name="company_profile/account/CompanyAccount"/>
             ~<exception type="docsense.validation.AccountNotFound">
      306         <view frame="stdFrame" component="stdError"
                  name="company_profile/account/CompanyAccountError/>
             </exception>
    </viewMap>
</controlAction>
```

FIG. 4

```
<html>
    <head>
        <title> Untitled Document </title>
        <meta http-equiv="Content-Type" content="text/html; charset=iso-8859-1"/>
        <LINK rel="stylesheet" type="text/css" href="incudes/default.css"/>
    </head>
    <body bgcolor="#FFFFFF">
        <table width="100%" border="0" cellspacing="0" cellpadding="0">
            <tr bgcolor="#CCCCCC">
                <td colspan="4">
                    <component type="include">                    ⎫
                        <urlparam name="name"                     ⎬ 401
                            value="public/header.htm"/>           ⎭
                    </component>
                </td>
            </tr>
            <tr>
                <td colspan="4" bgcolor="#94B6D6" height="10">
                    <img border="0" src="images/1x1.gif" width="1"
                        height="10"/>
                </td>
            </tr>
            <tr>
                <td width="140" valign="top">
                    <component type="MenuObject">                 ⎫
                        <urlparam name="menu"                     ⎬ 402
                            value="mainmenuv.xml"/>               ⎭
                    </component>
                </td>
                <td width="1" bgcolor="#FF0000">
                    <img border="0" src="images/1x1.gif" width="1"/>
                </td>
                <td width="10" valign="top">
                    <img src="images/1x1.gif" width="10"/>
                </td>
                <td width="95%" valign="top">
                    <component type="AppObject"/>   ⎬ 403
                </td>
            </tr>
            <tr>
            <td align="center" width="150">
                <a href="http://www.docsense.com/solutions/d3.html">
                    <img src="images/powerbyd3.gif"
                        width="150" height"41" border="0"
                        alt=""/>
                </a>
            </td>
            <td colspan="3" align="center">
                <component tyoe="include">
                    <urlparam name="name" value="public/footer.htm"/>
                </component>
            </td>
            </tr>
        </table>
    </body>
</html>
```

FIG. 9

```
documentLoaderFileAgent.xml

<agentDefinition name ="documentLoaderFileAgent"/>

<jobAction path="agent/job_actions/loadDocumentFileAgentAction.xml" interval="1">
    <jobDirectories>
      <jobDirector path="config/D3/agent/agent0"/>
      <jobDirector path="config/D3/agent/agent1"/>          } 901
      <jobDirector path="config/D3/agent/agent2"/>
    </jobDirectories>
  </jobAction>

<controlAction path="agent/job_actions/loadDocumentFileAgentAction.xml">
    <modelObject id="DocumentLoader" scope="page" class="com.docsense.utility.DocumentLoader">
      <setProperty name="XmlInputPath">
        <primitive type ="string">                              } 902
          </parameter value="INPUTFILEPATH"/>
        </primitive>
      </setProperty>
      <setProperty name="Packed">
        <primitive type="boolean">                              } 903
          </parameter value="true"/>
        </primitive>
      </setProperty>
      <setProperty name="SecurityLevel">
        <primitive type="int">                                  } 904
          </parameter value="3"/>
        </primitive>
      </setProperty>
      <doAction name="loadDocument"/>
    </modelObject>
  </controlAction>
</agentDefinition>
```

{ 900

CUSTOMIZABLE SOFTWARE AGENTS IN AN ELECTRONIC BILL PRESENTMENT AND PAYMENT SYSTEM

TECHNICAL FIELD

The present invention relates to a customizable electronic bill presentment and payment (EBPP) system using software agents to perform automated tasks.

BACKGROUND

Many organizations are becoming more involved in conducting business electronically (so called e-business), over the Internet, or on other computer networks. E-business calls for specialized applications software such as Electronic Bill Presentment and Payment (EBPP) and Electronic Statement Presentment applications. To implement such applications, traditional paper documents have to be converted to electronic form to be processed electronically and exchanged over the Internet, or otherwise, with customers, suppliers, or others. The paper documents will typically be re-formatted to be presented electronically using Hypertext Markup Language (HTML) Web pages, e-mail messages, Extensible Markup Language (XML) messages, or other electronic formats suitable for electronic exchange, processing, display and/or printing.

Billers who provide their customers with the option of viewing and paying their bills over the Internet have varying requirements for the business content to be provided. In addition to varying content, different billers will want the customer interface and presentation of the billing information to have a particular "look-and-feel."

Instead of programming their own EBPP system from scratch, billers have the option of purchasing or outsourcing a pre-made EBPP system from a vendor. The biller may also hire a third party electronic billing service to provide the desired EBPP services to the biller's customers. In any of these situations, a pre-made EBPP system must be customized to meet the particular business and presentation requirements of the biller. Accordingly, a vendor who provides an EBPP solution to multiple billers needs to consider the extent to which its system can be customized, and the ease with which customization can be achieved.

FIG. 1 depicts a prior art EBPP system. In the prior art system, for one or more billers, EBPP computer system 10 controls the presentment of billing service web pages 40 over the Internet 2 to customer 1. Billing information is gathered by EBPP computer system 10 from the biller's legacy computer systems 20. Typically, billing data will be parsed by EBPP system 10 from a print stream generated by the legacy system 20, the legacy print stream being originally intended for printing conventional hard-copy bills. A preferred method for parsing billing data from the legacy print stream is described in co-pending patent application Ser. No. 09/502,314, titled Data Parsing System for Use in Electronic Commerce, filed Feb. 11, 2000, which is hereby incorporated by reference into this application.

In addition to communication via web pages 40 generated during a session, EBPP computer system 10 includes the capability of sending and receiving e-mail messages 50 to and from the user 1. Typically, system 10 will generate a message to user 1 upon the occurrence of a predetermined event. An example of such an event is a new billing statement becoming available, or the approach of a due date for an unpaid bill. EBPP system 10 is also capable of communicating with a bank or ACH network 30 to process bill payment activities.

System 10 includes a data repository 11 in which billing data for use with system 10 may be stored in a variety of formats. Data in the repository can be organized in a database, such as the kind available from Oracle or DB2. Statement data archives may also be stored in a compressed XML format. XML is a format that allows users to define data tags for the information being stored.

The EBPP computer system 10 itself is typically comprised of standard computer hardware capable of processing and storing high volumes of data, preferably utilizing a J2EE platform. EBPP system 10 is also capable Internet and network communications. Of interest with respect to the present patent application, the prior art EBPP computer system 10 includes a software architecture within an application server 12 for generating and handling electronic billing functions. At a fundamental level, the software architecture of the prior art system 10 is split into two conceptual components, the front-end presentation logic 13 and the back end servicing logic 14. The split between front-end and back-end logic 13 and 14 serves to reduce the amount of recoding necessary for the system to be customized for different billers.

The front-end presentation logic 13 is the portion of the software that is the primary Internet interface for generating web page presentations. As such, the front end presentation logic 13 includes code that is custom written to meet the specific business and presentation needs of the biller. Functionality that might be included in front-end logic 13 is enrollment, presentation, payment instructions, and reporting.

Typically, front-end logic 13 is comprised of Java Server Pages (JSP's) that control the presentation of billing information in the form of web pages. The front-end logic JSP's also receive and respond to inputs as the customer makes requests for various services to be provided. The JSP's can be recoded to accommodate different look-and-feel and business requirements of different billers. Within the JSP's, front-end logic 13 can also utilize Enterprise Java Beans (EJB's) that comprise objects for performing specific tasks.

The back-end services logic 14 comprises the software for functions that typically do not need to be customized for particular billers. Preferably, very little of the back-end services must be customized for a particular biller's needs. For example, back-end logic may include the software for extracting the billing data from the biller legacy billing computers 20. Similarly, logic for handling of payments with the bank or ACH network 30 and systems for generating and receiving e-mail messages will be handled in the back-end services logic 14.

As a result of the distinction between the front-end and back-end logic 13 and 14, re-coding of software to provide customization for different billers is somewhat reduced. However, a significant amount of presentation logic and some business logic must always re-written to meet a particular biller's needs. The re-coding required for customization can require a high degree of programming skill and can add expense to implementation of a biller's on-line presence. The requirement for re-writing code introduces a risk that changes to the way that a web page looks may in fact introduce a problem that could cause the content of the information being displayed to be incorrect. Another problem with this prior art system is that after a system is customized it may be difficult to provide upgrades and future releases of the software. In order to be sure that new releases work properly substantial efforts would be necessary to retrofit the new release with the code changes that were made for the particular biller.

In the prior art EBPP system 10, back end logic 14 or front end logic 13 may also include software agents that perform periodic tasks without prompting from an end-user 1. For example, the system 10 may monitor for the presence of new billing information available to be loaded. Upon detecting the presence of new billing information, a software agent runs a job to load the new information based on parameters programmed into the software agent.

As with other aspects of the front and back end logic 13 and 14, the ability to customize the software agents is an important consideration in enabling a system used to service multiple billers. If a biller wanted an agent to run a document loading job based on different parameters than another biller, then those varying parameters may require recoding or reprogramming of logic. Similarly, a biller may only want to use some available software agents, but not others, in providing EBPP services. Software agents that are important to one biller, may be of little interest to another. Thus the concerns about customization and upgradeability discussed above, are just as important for the software agent portions of the EBPP systems.

In the prior art, certain Internet services such as "Yahoo!" and "Excite" have allowed registered users to create personalized web pages. Such personalized web pages allow the user to select certain information and presentations of the information available from the service. When the registered user visits the web site and is recognized, the user's selected information and arrangement is displayed. For example, the user may choose to see an arrangement including a weather report for his region, sports scores for his favorite teams, and stock quotes for his investment portfolio. These personalization features, however, do not provide a way for a biller to offer EBPP services customized to its particular business and presentation needs. Further, these personalization features do not include capability for customization of software agents that perform tasks to operate the an EBPP system.

Accordingly, the prior art leaves disadvantages and needs to be addressed by the present invention, as discussed below.

SUMMARY OF THE INVENTION

The present invention provides a customizable EBPP system whereby the base logic for software agents need not be changed in order to provide customization to different billers. Rather, customization features are stored in data repositories, preferably in XML format. An administrator can select which agents to activate based upon a customized list of available agents. Then the customized parameters for activating and running the jobs with the agent is further loaded from customized repository files at the appropriate time. Accordingly, customization for a particular biller is achieved by changing data stored in an easily modified repository, rather than reprogramming core logic.

The electronic bill presentment computer system of the present invention provide bill information from a biller to a remote customer over a network. The electronic bill presentment computer system performs automated system tasks during operation. The automated tasks are customized to meet preferences of the biller. The system further includes a first storage facility, called an available agent descriptor repository, having a list of software agents available to perform automated system tasks pertinent to the system preferences of the biller. A second storage facility, an agent action descriptor repository, stores operating parameters for software agents listed in the available agent descriptor repository. These operating parameters are customized for the system preferences of the biller.

An agent logic module retrieves and displays the list of software agents from the available agent descriptor repository and presents them to an administrator of the electronic bill presentment computer. From the administrator, the agent logic module receives instructions to select one or more of the software agents for use with the system. Based on the received instruction, the agent logic module activates the one or more selected software agents in accordance with corresponding operating parameters stored in the agent action descriptor repository.

An important feature of the invention is that the available agent descriptor repository and the agent action descriptor repository be discrete from the agent logic module, thereby providing that said repositories independently reflect the biller's particular preferences. The information in the repositories is customizable for the biller. In the preferred embodiment of the invention information is stored in the repositories in XML format.

Other variations on the basic invention will be described in the detailed description and the enumerated claims below.

BRIEF DESCRIPTION OF DRAWINGS

The present invention is illustrated by way of example, in the figures of the accompanying drawings, wherein elements having the same reference numeral designations represent like elements throughout and wherein:

FIG. 3 is a sample HTTP request and corresponding XML action descriptor for use with the present invention;

FIG. 4 is a sample look-and-feel template stored in XML format for use with the present invention;

FIG. 9 is a sample of customized stored parameters in XML format for activating and running a software agent.

DETAILED DESCRIPTION OF THE INVENTION

Reference is made to a previously filed application Ser. No. 10/153,105 entitled CUSTOMIZABLE ELECTRONIC BILL PRESENTMENT PAYMENT SYSTEM AND METHOD, by Robert Laprade, et al., filed May 22, 2002, and to concurrently filed application Ser. No. 10/185,924 entitled TEMPLATE FOR INPUTTING CUSTOMIZED PROCESSING FEATURES IN AN ELECTRONIC BILL PRESENTMENT AND PAYMENT SYSTEM, by Andrew Tosswill which are hereby incorporated by reference.

Figure 2:
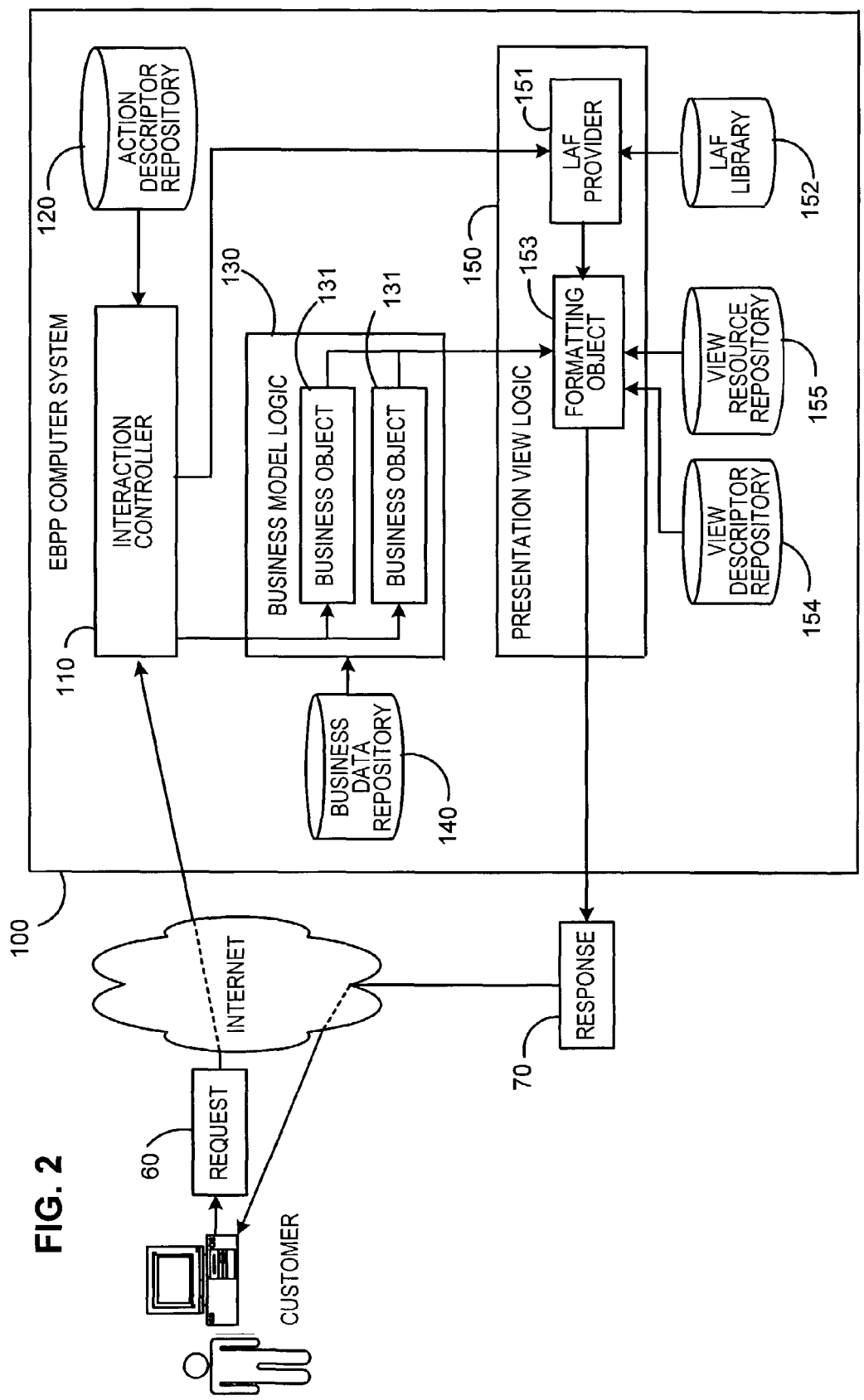
FIG. 2 is a customizable EBPP system using a dynamic MVC architecture.

A customizable EBPP system in accordance with the present invention is depicted in FIG. 2. EBPP computer system 100 includes an EBPP software product in accordance with the present invention that can be extended and customized without inhibiting subsequent upgrades and without modifying the base code set for the product. In part, this is accomplished by incorporating what will be referred to as a dynamic model-view-controller methodology.

To a customer 3, interacting with the EBPP system 100 of the present invention through the Internet 2, the functionality and presentation of information on a EBPP web page will not necessarily be distinguishable from a prior art EBPP system 10. However, the manner in which EBPP computer system 100 processes interactions with customer 3 will be significantly different.

At the beginning of a session, a customer 3 uses an Internet browser (Netscape, Internet Explorer, etc.) to visit the biller's EBPP website. To initiate an EBPP transaction the customer 3 will click on a button or a link on a web page that will cause a transaction request 60 to be sent to the web server housing the EBPP system 100. The request 60 is typically in HTTP format, and includes a URL parameter for the customer 3. Request 60 is processed by EBPP system 100 and an appropriate response 70 is presented, typically in the form of a web page. This interaction continues as long as the customer 3 is accessing the web site.

In the preferred embodiment of the invention, the processes for generating the response 70 based on the request 60 can be described as using a novel "dynamic MVC" architecture or methodology. The system is "dynamic" in the sense that the same model, view, and control related components can be used to provide customized EBPP service using a common set of base code. The dynamic aspect of the invention relies on customized data stored independently of the core logic. The customized data can be interpreted as instructions that activate the specially designed logic modules in a manner that they can provide a very wide range of customized functionality. These advantages of customized data also apply to software agents and agent servlets running jobs in the background of the system, even when not responding to a specific customer request.

The business model logic module 130 represents the business logic needed to fulfill the request 60. In the preferred embodiment the business logic module 130 is comprised of business objects 131 that interact with the business data repository 140, perform calculations, and provide coordination between related objects.

Presentation logic 150 is responsible for constructing the response, which in most cases will be an HTML web page, showing the results of requests and links or buttons to allow for additional requests. The content and format of a presentation is based on content descriptors pertinent to the particular information to be presented and a look-and-feel (LAF) framework active for the current session. LAF data is stored in a repository called the LAF repository 152 and descriptor data for how to present particular results is stored in a view descriptor repository 154. Also, further data for cosmetic features such as graphics or fonts is available for use and stored in a view resource repository 155.

Interaction controller 110 processes the HTTP request and data sent from the customer and instructs the business model logic module 130 to activate the appropriate business objects 131. The interaction controller 110 also selects a presentation look-and-feel to initiate from the LAF provider 151 to prepare an appropriate presentation to send back to the customer 3 upon completion of the response to the request 60.

The controller 110 controls the processes of the business logic module 130 and the presentation view logic 150 based on sets of instructions called action descriptors that are stored in the action descriptor repository 120. For a request from a particular customer 3, the controller 110 will retrieve a corresponding action descriptor. The action descriptor is interpreted by the controller 110 for subsequently controlling logic modules 130 and 150. In the preferred embodiment of the invention, the actions descriptors are stored in XML format in the action descriptor repository 120. The XML action descriptors may then be modified relatively easily to provide customized responses for different billers, without the necessity of rewriting base code for the interaction controller 110, the business model logic module 130 or the presentation view logic module 150. XML is a preferred format because it is a universally usable language for data on the Web. Further, XML allows the creation of unique data formats to allow greater flexibility to for the purposes of allowing customization. In particular, the ability to create an unlimited number of tags in XML allows this flexibility. XML is also a good way to store information because it can be easily read and understood by humans and machines. XML has the advantage that it describes the content of the data, rather than how it should look.

In operation, the interaction controller 110 accepts an HTTP request received from the customer 3. In the preferred embodiment the controller determines actions to be invoked based on the URL parameter passed with each request. The URL parameter will indicate both the name of the dialog and the path that categorizes the dialog. For example, a request with "url=/company_profile/accounts/CompanyAccount" will invoke the dialog named "Company Account." This dialog is associated with the path "company_profile/accounts" that basically mirrors the menu option at the web page, at customer's computer, that is used to invoke the dialog.

Once the controller 110 determines the dialog to invoke from the URL parameter, it will retrieve a corresponding action descriptor XML for that dialog from the action descriptor repository 120. The action descriptor XML will contain the instructions describing what must occur for the interaction corresponding to the request to be completed. The action descriptor preferably describes which business objects 131 to instantiate, what methods to invoke on each off the business objects 131, and based on the results of those methods, which presentation to send back to the user 3.

An exemplary HTTP request 200 from user 3 is depicted in FIG. 3 with a corresponding "Company Account" XML action descriptor 300. In response to the HTTP request 200, interaction controller 110 retrieves and interprets action descriptor 300. At step 301 of the script, controller 110 interprets an XML tag called "controlAction" defining responses to requests that have a particular URL parameter where "path=company_profile/account/CompanyAccount." At step 302 of the script, instructions to controller 110 for instantiating the "CompanyAccount" class are provided for the modelObject tag. Interpreting step 303, the controller 110 will invoke a "setAccountKey" method of the CompanyAccount class, passing in a type "long" argument. The value of the type long argument will be retrieved from the HTTP request 200 parameter named "AccountKey" taken from the URL request. In the HTTP request 200 example of FIG. 3, this value is "23." At step 304, the controller 110 initializes the business object via the doAction name="load" call.

The XML action descriptor 300 further includes instructions for presentation of results generated by the business object 131. If the business objects return a successful completion, then at step 305 the controller 110 instructs that a responsive presentation will use the view "stdForm" that will use the form descriptor named "CompanyAccount." If the business object fails, however, the controller will invoke an exception presentation using instead the view "stdError" and form descriptor named "CompanyAccountError," in accordance with script step 306.

The business objects 131 within the business model logic module 130 preferably represent Java classes that will enforce certain basic business rules that are required by the system. These rules ensure the integrity of the information being manipulated in response to a request from a customer. For example, a business object "CompanyAccount," as described above, can include provisions to ensure that the values of other fields such as a company profile identification, or a user identification are set correctly for each CompanyAccount item, without the need to explicitly set them via an instruction in the action descriptor 300. In prior art systems, much of the business rule logic was incorporated in JavaServer Pages in the front end presentation logic 13 (see FIG. 1). The prior art presentation logic 13 required re-coding to allow customization for different billers. In contrast, the present invention allows that business object 131 be constant for all billers, with the activation of those objects being customized through adjustments to the XML in the action descriptor repository 120.

Business objects 131 provide more intuitive and higher level Application-Program Interface (API) that is used by the interaction controller 110 and objects in the presentation view logic module 150. This provides the controller 110 and presentation logic 150 with more efficient means to interact with lower level items via the business objects 131. The business objects 131 effectively shield the controller 110 and presentation logic 150 from the granularity of the interaction with the basic data objects.

The business objects 131 also provide helper methods that are utilized by the presentation view logic module 150. In the case of the exemplary CompanyAccount dialog, in order for a new "UserAccount" field to be defined, it may be that values for "Publisher" and "PaymentProfile" fields must be chosen. To help the presentation logic, the CompanyAccount business object provides an API that will retrieve a list of valid Publishers (CompanyAccount.PublisherList) as well as a method to retrieve the possible payment profiles that could be used for this account (CompanyAccount.PaymentMethodList). These lists may be stored in the business data repository 140 in any desired format such as an Oracle database or XML.

The CompanyAccount business object discussed herein could also provide access to other data objects that are associated with the account that is currently loaded. For example, an "AutoPayment" object that is connected to this particular account is easily accessed via an API call to "get AutoPay." This method call doesn't require the action descriptor to provide information about the Autopayment record. Once the appropriate script has been activated by controller 110, the business object 131 determine itself which "AutoPayment" record to use. Relevant automatic payment data would be stored in the business data repository 140.

Using this preferred embodiment of the present invention, the business objects 131 provide the API set for the general business function, not just the current interactions. Further, multiple interactions can use the same business object 131. Using the present invention, the business objects 131 can act in accordance with any number of "doAction" calls, as identified in the XML of the action descriptor repository 120, or elsewhere.

In operation, the presentation view logic module 150 provides the facilities to return a visual presentation to a user in response to an interaction request. As discussed above with respect to FIG. 3, the presentation can be determined based on the success or failure of the interaction controller 110 to execute the action descriptor.

In the preferred embodiment of the invention, a response 70 generated by the presentation view logic module 150 is an HTML web page presentation. Two factors that preferably determine the presentation of the HTML web page are the look-and-feel (LAF) active for the current request and an XML view descriptor indicated in the action descriptor.

The LAF template is derived by the LAF provider object 151 as selected from the LAF library 152. View descriptors are stored in the view descriptor repository 154. As with respect to the action descriptors, the view descriptors are preferably stored in XML format. The presentation view logic module 150 further includes a view resource repository 155 comprising data pertaining to cosmetic features such as graphics or special fonts.

The LAF template is the framework structure of the HTML presentation. The LAF template determines where the main menu will appear, where the list or form presentation will appear on the page, and the way that each of these items will appear via a reference to the appropriate style sheet definitions. The LAF provider object 151 is responsible for architecting the overall shape and positioning of content in a web page. LAF object 151 is invoked by the interaction controller 110 after the action descriptor methods for a specific request have been completed by the business model logic module 130. The LAF object 151 and the template stored in the LAF library 152 are referenced in the action descriptor in the action descriptor repository 120. The LAF object 151 has initialization parameters that reference appropriate XML in the LAF library 152 to use as a template to structure the web page.

Figure 5:
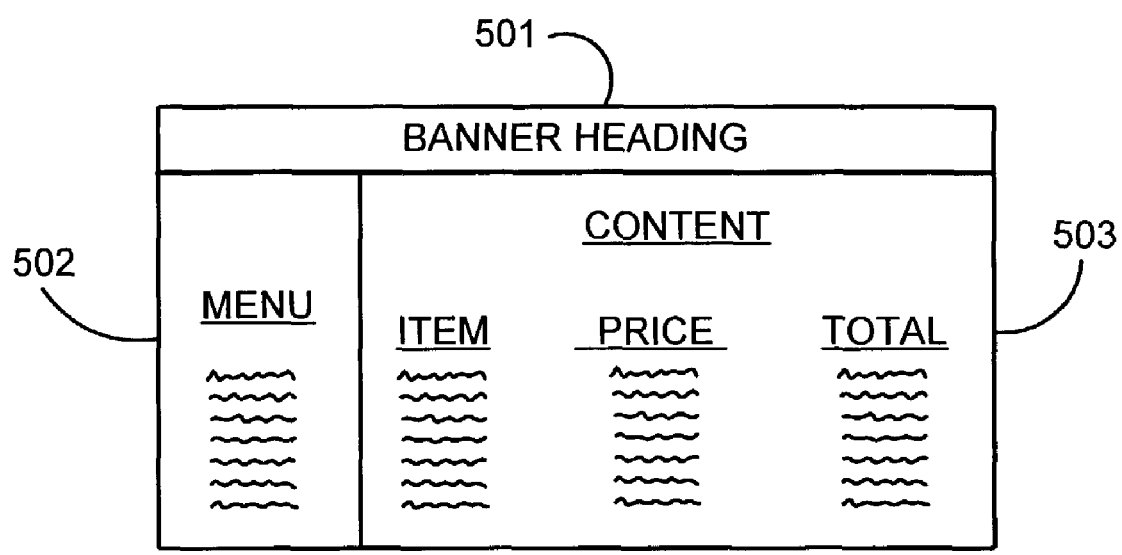
FIG. 5 represents a typical web page layout that could be generated using the presentation features of the present invention.

The LAF library 152 can include specific tags that identify HTML presentation parameters and presentation objects to be invoked by the LAF object 151. In the example shown in FIGS. 4 and 5, the HTML stored in the XML at step 401 may describe a page having a banner 501 across the top of the page and another step 402 may describe a menu area 502 along the left side of a certain width. The HTML for step 402 also includes HTML indicating that a presentation object called "MenuObject" should be invoked at that point to create the appropriate HTML to render a menu. Later in the XML, at step 403, a tag indicates that an object called "AppObject" should be invoked to create content to fill the defined area 503 on the right side of the page. The call for the "AppObject" of "application object" is a call to utilize the business logic results provided from a business 131 that provides a substantive result. In turn, the formatting object 153 provides the specific logic for turning the results into a format that can be inserted into the defined area 503.

An example of view descriptors in repository 154 may be scripts of instructions for presenting a "LIST" of items, or they may describe elements of an HTML FORM to be presented at the user's browser, or there may be a pointer to a simple JavaServer Page (JSP). These view descriptors are retrieved by formatting object 153 for a particular type of business result that is obtained from the business logic module 130.

The formatting object 153 (or any of the objects discussed in this application) may actually be a group of one or more objects for operating on particular business results from the business logic module 130, for presentation within the LAF template identified by the LAF provider 151. For example, if a "LIST" presentation is required by the view descriptor XML for the business results, a standard hosting object (part of formatting object 153) that uses a "listObject" class will be invoked with an argument that points "listObject" to the appropriate list descriptor in repository 154 that describes the elements and format of the list items to be presented. The list descriptor will describe each element that is to be displayed in the list and may associate that element with an API call to a business object that was invoked pursuant to an action descriptor from repository 120. Headings for list elements may be static text or references to a resource item from the view resource repository 155.

If a "FORM" type presentation is required by the view descriptor XML, a standard hosting object (again part of formatting object 153) that uses the "formObject" class will be invoked with an argument that points the "formObject" to the appropriate form descriptor. This form descriptor will describe the form elements that are to appear on the presentation. Each element will be associated with an API call to a business object 131 that was invoked by controller 110 pursuant to a stored XML action descriptor from repository 120. Any text that appears on the form such as a label for a field can be static text or may be a reference to a resource item from the view resource repository 155.

Figure 1:
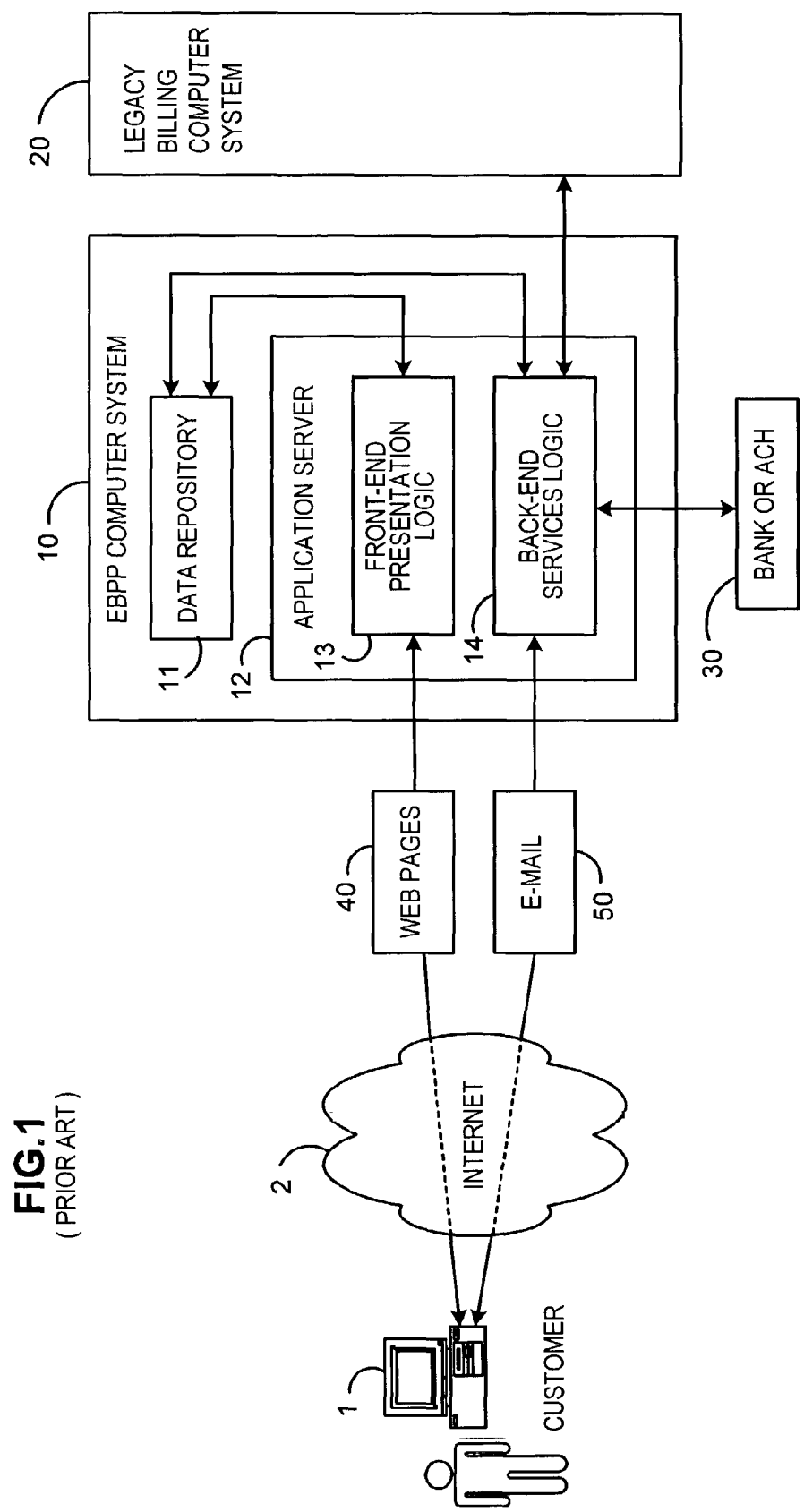
FIG. 1 is a prior art EBPP system.

The combination of the presentation descriptors from repository 154 and the formatting objects 153 remove the responsibility of the presentation from the coding of a JSP page that was used in the prior art system in FIG. 1. Instead, the appearance of the web page as well as the content of that page is controlled via configuration information stored in the respective repositories 120, 140, 154, and 152. These respective repositories are independent of the core software code that can be provided as a base product to individual billers, who may then achieve customization relatively easily by preparation of XML instruction scripts to be used with their processing and presentation of their billing data.

Repositories, including 120, 140, 154, and 152, may reside in any number or configuration of physical storage devices. Also, the data for those repositories may be stored in common or separate data organizational structures. As long as the information is retrievable, the data can be stored in any combination of appropriate formats, i.e., database, directory tree, etc.

Figure 6:
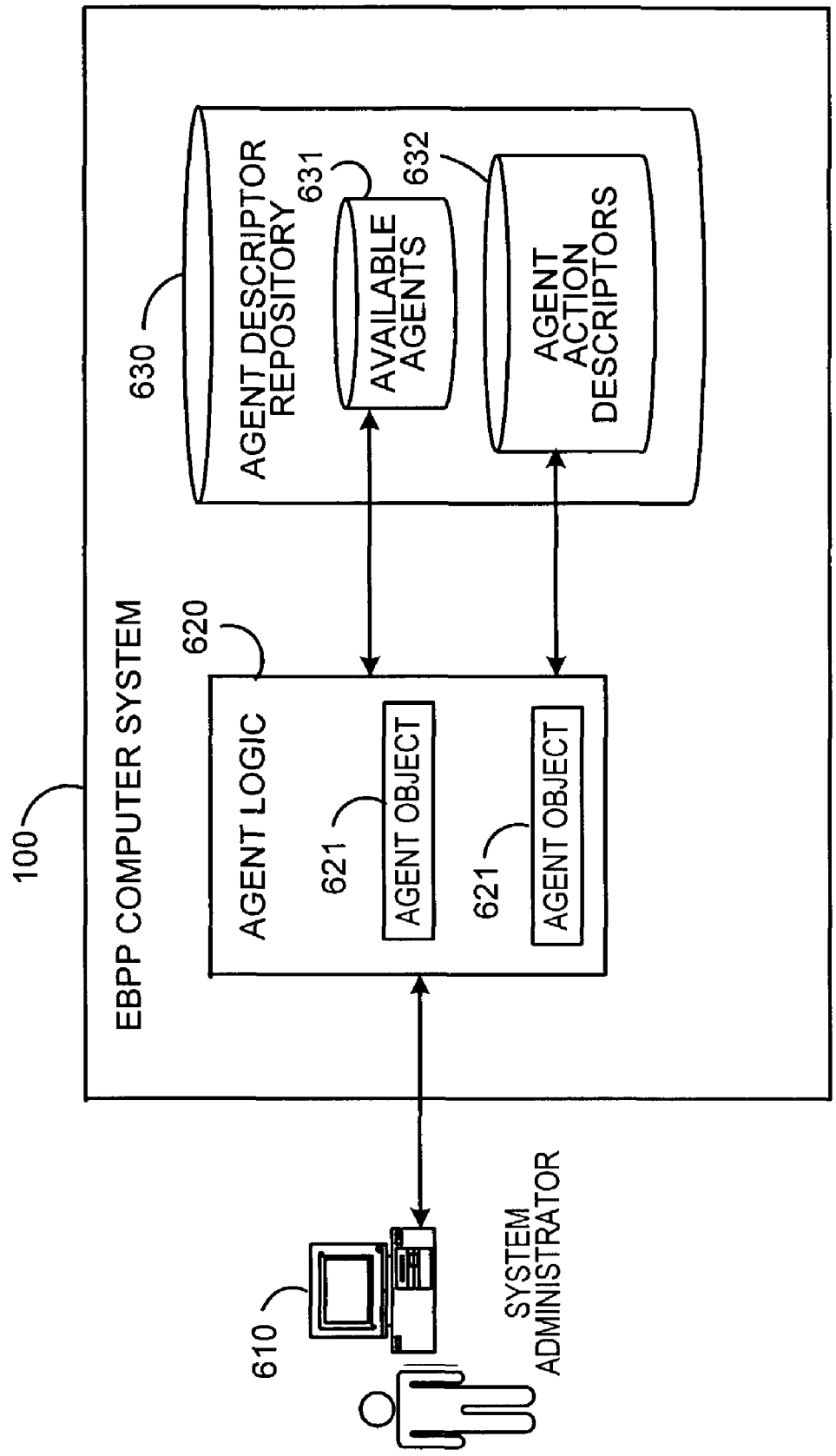
FIG. 6 is a customizable EBPP system according to the present invention utilizing an agent descriptor repository.

The EBPP system 100 described herein includes functionality and logic for responding to requests 60 from a customer using appropriate business and presentation logic. As shown in FIG. 6, in addition to having logic that is directly responsive to customer requests, the preferred embodiment of the system includes agent logic 620 for performing tasks and jobs within the EBPP system 100. The use of customized agents and agent servlets in EBPP system 100 is analogous to the use of base code and customized repository data as described above. Agent tasks and jobs may typically be directed to routine matters for maintaining the readiness of the system to provide EBPP services, including status monitoring and executing predetermined jobs upon the occurrences of predetermined events. For example, an agent may be directed to monitoring security of the system. Another agent may periodically update databases of customer information. Yet, another agent may monitor for the presence of new billing information available to be processed by the EBPP system.

Within agent logic 620, agent objects 621 form the building block logic to perform these various software agent tasks. Preferably, agent objects 621 include sufficient functionality that any desired customized agent functionality can be accommodated. Available agents, built from agent object classes 621, and operation of those available agents for use in connection with any particular biller will be determined based on customized data stored in the agent descriptor repository 630.

In operation, an EBPP system administrator 610 accesses the EBPP system to control the available agents through agent logic 620. Agent logic 620 accesses the available agents repository 631, which includes a customized list of which agents are available for use with that system. The available agents repository returns an XML script 700 (see FIG. 7) to the agent logic 620, which in turn provides a presentation 800 (FIG. 8) of the available agents to the system administrator 610.

When the administrator 610 selects which agents to activate from the presentation 800, those selected agents are activated and run by agent logic 620 and agent objects 621 using the parameters stored in the agent action descriptor repository 632, and retrieved for the purpose of activating the agent. The parameters and job run information is preferably stored in XML format, as depicted in the sample agent action descriptor file 900 (FIG. 9.). Thus, in accordance with the present invention, the customizable information stored in the agent descriptor repository 630 controls biller specific functionality of agents within an EBPP system, while the agent logic 620 and agent objects 621 may remain static for all billers.

Figure 7:
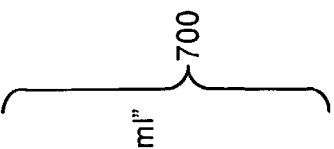
FIG. 7 is a sample of customized stored available agent information in XML format.
Figure 8:
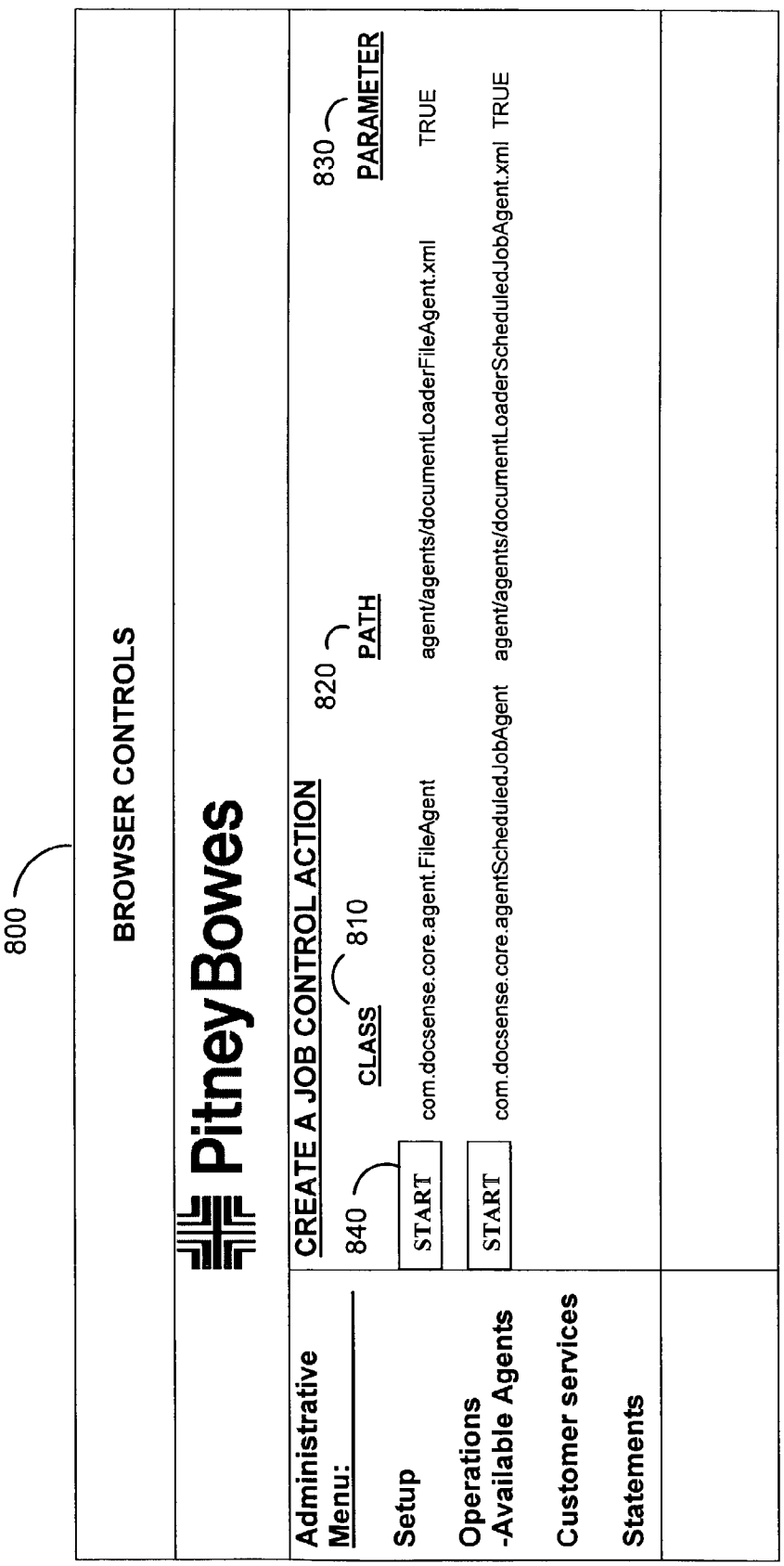
FIG. 8 is a sample graphical user interface by which an administrator can custom select which software agents to activate in the EBPP system.

FIG. 7 is depicts a sample customized XML script 700 retrieved from the available agents repository 631. In this example, two agent classes "FileAgent" and "ScheduledJobAgent" are listed, along with their respective initialization path and starting parameter. Based on the script 700 depicted in FIG. 7, the agent logic 620 would present a visual depiction of the available agents via display 800. The class of the agent is listed in column 810. The path further locating the initialization XML information is further listed in column 820. The Boolean initialization parameter is listed in column 830. From the display 800, the administrator 610 makes his or her selection of which of the two available agents are to be run by activating the graphical start button in column 840.

Assuming that the administrator 610 has chosen to activate the "FileAgent" class agent, the agent logic 620 consults that agent action descriptor file 900 for that class, located in the agent action descriptor repository 632. The path for locating the file 900 is stored in the agents available file 700 and shown in column 820 of display 800.

Agent logic 620 will then interpret the agent action descriptor file 900 to control the manner in which the "FileAgent" will operate. In this case, the "FileAgent" is an agent that will load new documents into the system. The agent action descriptor file may include references to yet further XML files for particular functions of the agent's operation, for example the jobAction path leading to the loadDocumentFileAgentAction.xml file, as written on the third line of file 900. As shown at the lines marked 901, directories for operation of the agent are defined. Finally for controlling the action of the agent, further parameters of the agent are defined in sections 902, 903, and 904 respectively.

As discussed above with respect to other repositories, repository 631 and its subcomponents 631 and 632 may reside in any number or configuration of physical storage devices. Also, the data for those repositories and their respective data files may be stored in common or separate data organizational structures. As long as the information is retrievable, the data can be stored in any combination of appropriate formats, i.e., database, directory tree, etc., and any number of repository files may cross-reference each other.

While the present invention has been described in connection with what is presently considered to be the preferred embodiments, it is to be understood that the invention is not limited to the disclosed embodiment, but is intended to cover various modifications and equivalent arrangements included within the spirit and scope of the appended claims. It should also be understood that certain features of the system described herein may be considered novel inventions in their own right, even if separated from the overall system described herein, and that the scope of protection afforded to the patentee should be determined in view of the following appended claims.

What is claimed is:

1. An electronic bill presentment computer system for providing bill information from a biller to a remote customer over a network, the electronic bill presentment computer system performing automated tasks during operation, the automated tasks being customized to meet preferences of the biller, the electronic bill presentment computer system configured and programmed to include:

an agent descriptor repository storing customized information, in a storage device, for activating one or more software agents to perform automated tasks in accordance with biller preferences;

an agent logic module comprising a processor configured for activating the one or more software agents based on the corresponding customized information stored in the agent descriptor repository; and wherein the agent descriptor repository is discrete from the agent logic module, thereby providing that said repository independently reflects the biller's particular preferences, the information in said repository being customizable for the biller wherein the agent descriptor repository comprises an available agent descriptor repository having a list of the one or more software agents available to perform automated system tasks pertinent to the system preferences of the biller, and an agent action descriptor repository including operating parameters for the one or more software agents listed in the available agent descriptor repository, the operating parameters customized for the system preferences of the biller; and wherein the agent logic module retrieves and displays the list of software agents from the available agent descriptor repository, the agent logic module receiving instructions to select one or more of the software agents; the agent logic module activating the one or more selected software agents based on corresponding operating parameters stored in the agent action descriptor repository.

2. The system of claim 1 wherein the available agent descriptor repository and the agent action descriptor repository are stored using descriptors in XML format.

3. A method for performing automated system tasks in an electronic bill presentment computer system for providing bill information from a biller to a remote customer over a network, the automated system tasks being customized to meet preferences of the biller, the method including:

storing, on a storage device, a customized list of software agents available to perform automated system tasks pertinent to the system preferences of the biller;

storing, on the storage device, customized operating parameters for software agents listed in the available agent descriptor repository, the operating parameters being customized for the system preferences of the biller;

retrieving, with a processor, the list of software agents;

presenting, with the processor, the list of software agents to an electronic billing system administrator;

receiving, with the processor, a selection of one or more of the software agents from the administrator;

activating, with the processor, the one or more selected software agents based on the corresponding stored customized operating parameters; and wherein the available agent descriptor repository and the agent action descriptor repository are discrete from the agent logic module, thereby providing that said repositories independently reflect the biller's particular preferences, the information in said repositories being customizable for the biller.

4. The method of claim 3 wherein step of storing the available agent descriptor repository and the step of storing the agent action descriptor repository stores the descriptors in XML format.

* * * * *